US009686825B2

(12) United States Patent
Underwood et al.

(10) Patent No.: US 9,686,825 B2
(45) Date of Patent: Jun. 20, 2017

(54) METHOD AND APPARATUS FOR COOLING A USER INTERFACE AND/OR DOOR OF A COOKING DEVICE

(75) Inventors: Matthew Underwood, Dorking (GB); Martin Behle, Remscheid (GB)

(73) Assignee: MANITOWOC FOODSERVICE UK LIMITED (GB)

( * ) Notice: Subject to any disclaimer, the term of this patent is extended or adjusted under 35 U.S.C. 154(b) by 832 days.

(21) Appl. No.: 12/872,661

(22) Filed: Aug. 31, 2010

(65) Prior Publication Data
US 2011/0209626 A1    Sep. 1, 2011

Related U.S. Application Data

(60) Provisional application No. 61/275,608, filed on Sep. 1, 2009.

(51) Int. Cl.
| G07F 9/10 | (2006.01) |
| A23B 4/03 | (2006.01) |
| A23B 4/044 | (2006.01) |
| B60H 3/00 | (2006.01) |
| F24C 15/32 | (2006.01) |
| A21B 1/00 | (2006.01) |
| H05B 6/64 | (2006.01) |
| F24C 15/02 | (2006.01) |
| A23N 7/00 | (2006.01) |
| G07F 17/00 | (2006.01) |
| F24C 15/20 | (2006.01) |

(52) U.S. Cl.
CPC ........... *H05B 6/642* (2013.01); *F24C 15/025* (2013.01); *H05B 6/6414* (2013.01); *A23N 7/005* (2013.01); *F24C 15/2007* (2013.01); *F24C 15/322* (2013.01); *G07F 17/0078* (2013.01)

(58) Field of Classification Search
CPC .. G07F 17/0078; A23N 7/005; A47J 37/0821; H05B 6/642; H05B 6/6414; H05B 6/6435; F24C 14/02; F24C 15/325; F24C 15/08; F24C 15/2007; F24C 15/322; F24C 3/027; F24C 15/025
USPC .......... 99/357, 474, 333; 219/757, 739, 391, 219/400, 702, 720; 126/19 R, 21 R, 126/21 A, 273 R
See application file for complete search history.

(56) References Cited

U.S. PATENT DOCUMENTS 2,839,044 A *  6/1958 Phares .................. 126/39 C
3,310,046 A *  3/1967 Scott et al. ............. 126/21 A
3,608,770 A     9/1971 Nalmoli
(Continued)

OTHER PUBLICATIONS

International Preliminary Report on Patentability dated Oct. 17, 2011 from corresponding PCT/US2010/047395.
(Continued)

*Primary Examiner* — Quang D Thanh
*Assistant Examiner* — Hemant Mathew
(74) *Attorney, Agent, or Firm* — Ohlandt, Greeley, Ruggiero & Perle, L.L.P.

(57) ABSTRACT

A cooking device includes a user interface having an outer surface. The user interface is connected to an outer enclosure. A duct is connected to the user interface. A door is connected to the outer enclosure. A cooling device is in thermal communication with a member selected from the group consisting of the outer surface and the door. The cooling device is connected to the user interface or the door by the duct.

17 Claims, 2 Drawing Sheets

(56) References Cited

U.S. PATENT DOCUMENTS

| | | | |
|---|---|---|---|
| 3,633,561 A * | 1/1972 | Barnett et al. | 126/21 R |
| 3,659,578 A * | 5/1972 | Davis | F24C 14/02 |
| | | | 126/21 R |
| 3,696,845 A | 10/1972 | Acker et al. | |
| 3,713,401 A | 1/1973 | McClurkin | |
| 3,744,963 A | 7/1973 | Flynn | |
| 3,766,018 A | 10/1973 | Riechert | |
| 3,832,988 A | 9/1974 | Doner | |
| 3,858,568 A | 1/1975 | Seidel | |
| 3,889,099 A * | 6/1975 | Nuss | F24C 15/006 |
| | | | 126/198 |
| 3,889,100 A | 6/1975 | Dills | |
| 3,911,893 A * | 10/1975 | Baker et al. | 126/21 A |
| 3,921,617 A | 11/1975 | Rumbaugh | |
| 3,924,601 A | 12/1975 | Nuss | |
| 4,006,674 A | 2/1977 | Culver | |
| 4,112,916 A | 9/1978 | Guibert | |
| 4,132,216 A | 1/1979 | Guibert | |
| 4,180,049 A * | 12/1979 | Carr | H05B 6/642 |
| | | | 126/198 |
| 4,198,764 A | 4/1980 | Ellison et al. | |
| 4,263,888 A | 4/1981 | Pitts | |
| 4,269,169 A | 5/1981 | Guibert | |
| 4,326,497 A | 4/1982 | Guibert | |
| 4,332,993 A | 6/1982 | Shibahara et al. | |
| 4,381,443 A | 4/1983 | Guibert | |
| 4,444,175 A | 4/1984 | Reynolds | |
| 4,455,478 A | 6/1984 | Guibert | |
| 4,492,216 A | 1/1985 | Dumont | |
| 4,515,561 A | 5/1985 | Melgaard | |
| 4,539,469 A | 9/1985 | Gigandet | |
| 4,601,279 A | 7/1986 | Guerin | |
| 4,616,562 A | 10/1986 | Kuechler | |
| 4,622,762 A | 11/1986 | Reed | |
| 4,625,867 A | 12/1986 | Guibert | |
| 4,686,891 A | 8/1987 | Pouchard | |
| 4,763,638 A * | 8/1988 | Hurley et al. | 126/21 A |
| 4,825,848 A | 5/1989 | Macias | |
| 4,865,010 A * | 9/1989 | Kett | 126/21 R |
| 4,898,319 A | 2/1990 | Williams | |
| 5,107,821 A | 4/1992 | Von Blanquet | |
| 5,129,384 A | 7/1992 | Parks | |
| 5,241,947 A | 9/1993 | Sandolo | |
| 5,277,105 A | 1/1994 | Bruno et al. | |
| 5,379,685 A * | 1/1995 | Krasznai | A47J 37/08 |
| | | | 126/21 R |
| 5,441,036 A | 8/1995 | Mikalauskas, II et al. | |
| 5,447,606 A | 9/1995 | Pruitt | |
| 5,656,170 A | 8/1997 | Henderson | |
| 5,673,681 A | 10/1997 | Neitzel et al. | |
| 5,693,242 A | 12/1997 | Sanchez | |
| 5,765,388 A | 6/1998 | Kim | |
| 5,816,234 A | 10/1998 | Vasan | |
| 5,830,353 A | 11/1998 | Henderson | |
| 5,847,377 A | 12/1998 | Yang et al. | |
| 5,875,642 A | 3/1999 | Lee et al. | |
| 5,918,589 A | 7/1999 | Valle et al. | 126/193 |
| 5,996,572 A | 12/1999 | Ilagan | |
| 6,027,337 A | 2/2000 | Rogers et al. | |
| 6,058,924 A | 5/2000 | Pool, III et al. | |
| 6,173,710 B1 | 1/2001 | Gibson et al. | |
| 6,193,846 B1 | 2/2001 | Lelmu | |
| 6,234,161 B1 * | 5/2001 | Levi et al. | 126/21 R |
| 6,443,051 B1 * | 9/2002 | Suzuki | 99/330 |
| 6,621,058 B1 | 9/2003 | Kim | |
| 6,701,735 B1 | 3/2004 | Daddis, Jr. et al. | |
| 6,772,149 B1 | 8/2004 | Morelock et al. | |
| 6,776,611 B1 | 8/2004 | Sprague | |
| 6,874,331 B2 | 4/2005 | Chandler et al. | |
| 6,875,959 B1 | 4/2005 | Ciejek | |
| 6,888,117 B2 * | 5/2005 | Yang | 219/761 |
| 6,904,904 B2 | 6/2005 | Walther et al. | 126/198 |
| 6,965,101 B2 | 11/2005 | Kim et al. | |
| 6,992,273 B2 | 1/2006 | Yim et al. | |
| 7,098,432 B2 | 8/2006 | Rew et al. | |
| 7,156,087 B1 | 1/2007 | Churchill, III et al. | |
| 7,162,882 B2 | 1/2007 | Alahyari et al. | |
| 7,296,565 B2 | 11/2007 | Kim et al. | 126/198 |
| 7,312,425 B2 | 12/2007 | DeCobert et al. | 219/433 |
| 7,348,527 B2 * | 3/2008 | Braunisch et al. | 219/757 |
| 7,357,131 B2 * | 4/2008 | Moreth et al. | 126/198 |
| 7,368,684 B2 | 5/2008 | Kim et al. | 219/400 |
| 7,503,842 B2 | 3/2009 | Lee et al. | |
| 2002/0104445 A1 * | 8/2002 | Suzuki | 99/330 |
| 2004/0155035 A1 * | 8/2004 | Yang | 219/757 |
| 2005/0183715 A1 * | 8/2005 | Moreth et al. | 126/198 |
| 2005/0184048 A1 * | 8/2005 | DeCobert et al. | 219/506 |
| 2006/0157481 A1 * | 7/2006 | Oh et al. | 219/757 |
| 2007/0102426 A1 * | 5/2007 | Braunisch et al. | 219/757 |
| 2007/0125760 A1 * | 6/2007 | Kim et al. | 219/391 |

OTHER PUBLICATIONS

International Search Report dated Oct. 22, 2010 from corresponding PCT/US2010/047395.

* cited by examiner

METHOD AND APPARATUS FOR COOLING A USER INTERFACE AND/OR DOOR OF A COOKING DEVICE

CROSS-REFERENCE TO RELATED APPLICATIONS

This application claims the benefit of U.S. Provisional Application No. 61/275,608, filed Sep. 1, 2009. U.S. Provisional Application No. 61/275,608, filed Sep. 1, 2009 is hereby incorporated by reference in its entirety.

BACKGROUND OF THE INVENTION

1. Field of the Invention

The present disclosure relates generally to cooling a user interface and/or door and methods therefore. More particularly, the present disclosure relates to cooling an outer surface of a user interface and/or door.

2. Description of Related Art

Cooking devices such as ovens that use microwave, hot air, heating elements and the like, typically include a user interface so that a user may input, and/or the user interface may display, settings for temperature, time, and other parameters of the cooking device. To allow a user access, the user interface is typically placed above a door to a cooking chamber on a front wall of the cooking device. However, while food is heated within the cooking chamber, heat may be transferred to other portions of the cooking device including the user interface. The heat transferred to the user interface can cause damage and reduce the service life or time the user interface performs its intended function. Further, after food is heated within the cooking chamber and the door is opened to remove the food, the cooking device vents heat by releasing hot air and steam. The hot air and steam released from the cooking chamber can come into contact with the user interface that can both heat the user interface to an untouchable level and reduce service life of the user interface.

Accordingly, it has been determined by the present disclosure, there is a need for a device to cool a user interface of a cooking device. There is a further need for a cooling device that cools an outer surface of a user interface and/or door. There is still a further need for a cooling device that deflects hot air and/or steam that emanates from a cooking device away from user interface.

BRIEF SUMMARY OF THE INVENTION

A cooking device is provided that includes a user interface with an outer surface. The user interface is connected to an outer enclosure. A duct is connected to the user interface. A door is connected to the outer enclosure. A cooling device is in thermal communication with a member selected from the group consisting of the outer surface and the door. The cooling device is connected to the user interface or the door by the duct.

The above-described and other advantages and features of the present disclosure will be appreciated and understood by those skilled in the art from the following detailed description, drawings, and appended claims.

DETAILED DESCRIPTION OF THE INVENTION

Figure 1:
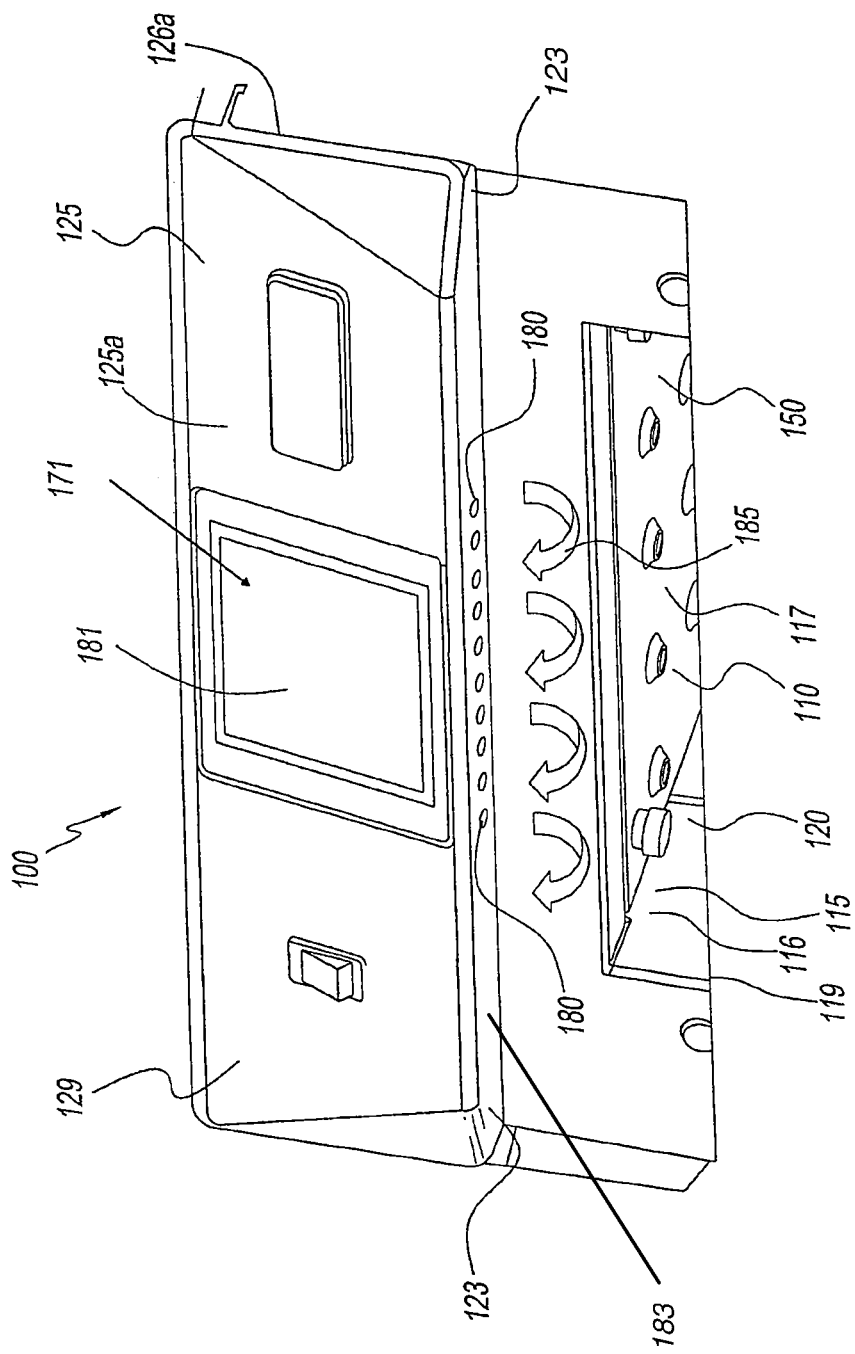
FIG. 1 is a partial front perspective view of a cooking device having a user interface according to the present disclosure.
Figure 2:
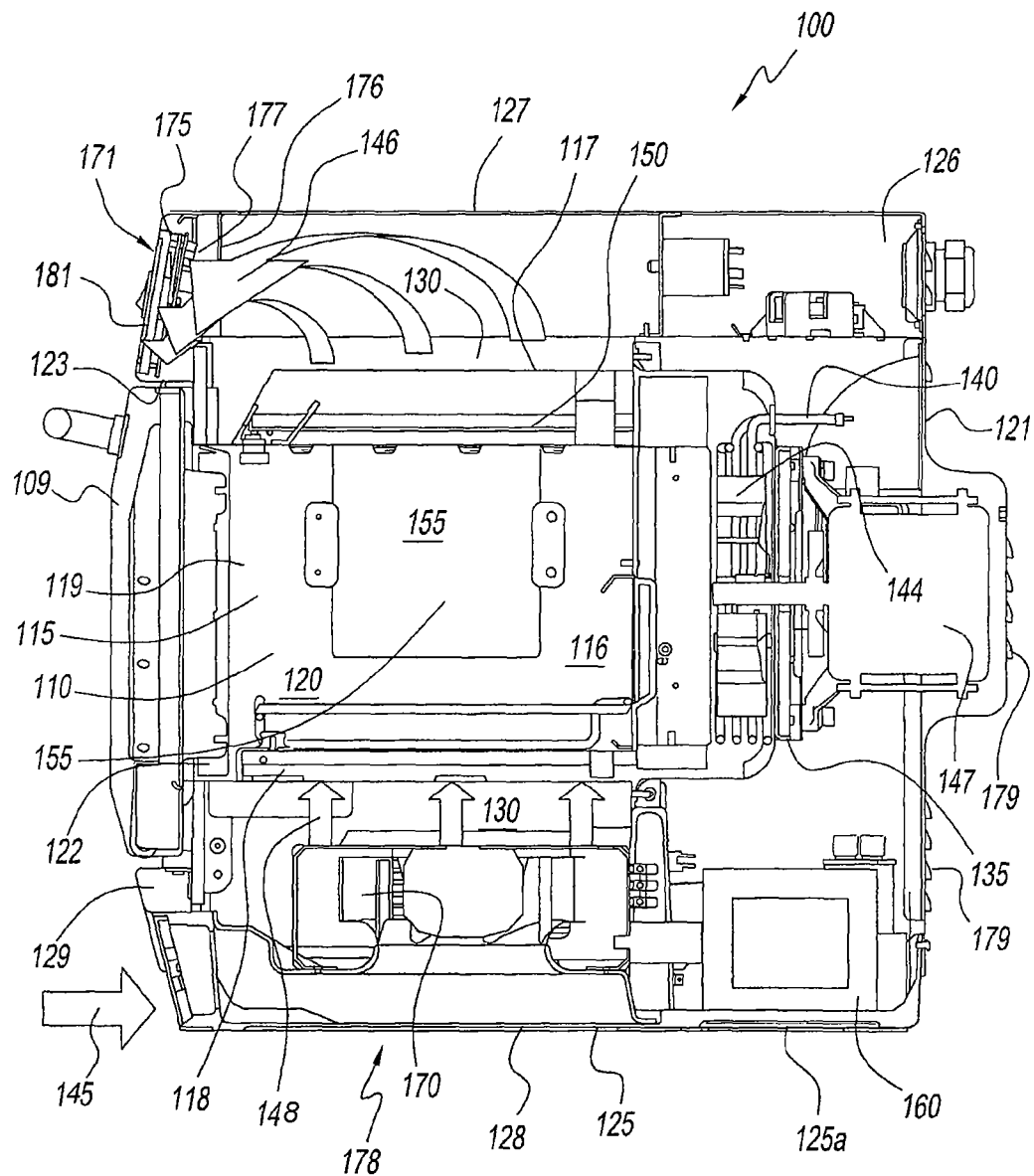
FIG. 2 is a side, cross-sectional view of the exemplary embodiment of the cooking device having the user interface of FIG. 1.

Referring to the drawings and in particular to FIGS. 1 and 2, an exemplary embodiment of a cooking device according to the present disclosure is generally referred to by reference numeral 100. Cooking device 100 may be any device that heats food, such as, for example, an oven.

Cooking device 100 has an outer enclosure 125 and an inner enclosure 110. Inner enclosure 110 has a chamber wall 115 surrounding an interior volume 120. Chamber wall 115 may include a first sidewall 116, a second sidewall (not shown) opposite first sidewall 116, a top wall 117, a bottom wall 118, and an open front portion 119. Open front portion 119 of inner enclosure 110 is covered by a door 109 when door 109 is in a closed position. Door 109 abuts against outer enclosure 125 to cover open front portion 119 in the closed position, as shown in FIG. 2, and uncovers or provides access to open front portion 119 when the door 109 is moved away from outer enclosure 125 in an open position, as shown in FIG. 1. Door 109 may move from the closed position to the open position, for example, by rotating about a hinge connected to both outer enclosure 125 and door 109 toward and away from outer enclosure 125.

Outer enclosure may have an outer wall 125a that has a first sidewall 126, a second sidewall 126a opposite first sidewall 126, a top wall 127, a bottom wall 128, a front wall 129, a rear wall 121, and an edge wall 123. Front wall 129 has an opening 122 therethrough covered by door 109 in the closed position and opening 122 is accessable when door 109 is in the open position. Edge wall 123 may be connected to front wall 129 on a side opposite to top wall 127 and extend toward interior volume 120 within opening 122.

Food (not shown) is placed within interior volume 120 to be heated. The food may be heated by impingement, convection, microwave, radiant heat, or other heating device. Interior volume 120 may be heated by an air heating device 135. Air heating device 135 is any device that heats inner enclosure 110, such as, for example, an electric heater or gas heater. Air heating device 135 may include a heating coil 140. Heating coil 140 may be an infrared heater and/or electric resistive coil. Air heating device 135 may also include a fan 144. A motor 147 rotates fan 144. Fan 144 circulates air across heating coil 140 to heat the air. Fan 144 directs the heated air into interior volume 120. Fan 144 may direct the air into interior volume 120 through a jet plate 150 that has apertures therethrough to heat the food by impingement.

Food (not shown) placed within interior volume 120 may be heated by a microwave device (not shown). The microwave device communicates microwaves through a plate 155 into cooking chamber volume 115. The microwaves within cooking chamber volume 115 heat the food.

Cooking device 100 has a control panel or user interface 171 connected to outer enclosure 125. User interface 171 allows a user to input, and/or user interface 171 may display, settings for temperature, time, and other parameters of the cooking device. User interface 171 may be any type user interface, such as, for example, a touchscreen, for example, a capacitive or resistive touchscreen, or any graphical, conversational or gesture user interface. User interface 171 is connected to cooking device 100 so that a portion 181 is in fluid or thermal communication with a duct 130. A portion 175 of user interface 171 may also be in fluid or thermal communication with duct 130. User interface 171 may be enclosed by a control box 176. Control box 176 has one or more holes 177 therethrough so to extend duct 130 to user interface 171. Portion 181 may be disposed outside of outer enclosure 125.

User interface 171 has a cooling device 178. Cooling device 178 reduces or maintains portion 181 of user interface 171 at a predetermined temperature, such as, for example, a temperature that reduces or prevents damage to user interface 171 due to heat. Cooling device 178 may also reduce or maintain portion 175 of user interface 171 at a predetermined temperature. Temperature reductions of portion 175 of user interface 171 can be in excess of 50 degrees Celsius.

Cooling device 178 is connected to user interface 171 by duct 130. Duct 130 may be formed between outer enclosure 125 and inner enclosure 110. However, duct 130 may be any duct placing user interface 171 and/or door 109 in fluid or thermal communication with cooling device 178. Cooling device 178 may include a fan 170. Fan 170 draws air from outside of cooking device 100 into duct 130. Fan 170 may be activated continuously when oven 100 is operating. Fan 170 is shown at a bottom of cooking device 100, however, fan 170 may be placed in other locations where air can be drawn into duct 130 from outside of cooking device 100.

User interface 171 may be connected to outer enclosure 125 adjacent door 109. Cooling device 178 may include fan 170 and/or one or more holes 122 in outer enclosure 125 and/or inner enclosure 110. Cooling device 178 may include fan 170 that generates an airflow within duct 130 and one or more holes 180. Holes 180 are below user interface 171, in a bottom facing surface 183, and above door 109. Holes 180 may be through edge wall 123. User interface 171 may be directly above holes 180. Holes 180 may be positioned across a full span of or surround open front portion 119. The size, pitch (or number) and shape of holes 180 vary depending on pressure of fan 170 and other external outlets of oven 100. Holes 180 may be between user interface 171 and door 109.

During operation of oven 100, heat is generated by heating device 135 and/or the microwave device and communicated to oven chamber 110 to heat food (not shown) within interior volume 120. Interior volume 120 increases in temperature with the activation of air heating device 135 and/or the microwave device. Heat generated by air heating device 135 and/or the microwave device may also be communicated to other areas of oven 100 such as a transformer 160 connected to a power source, motor 147 and user interface 171 that can cause damage or reduce service life. In addition, motor 147, transformer 160 and user interface 171 may generate heat when activated.

The air outside of oven 100 is at a lower temperature than duct 130 when oven 100 is heating interior volume 120. Fan 170 circulates the air from outside oven into duct 130 as shown by arrow 148. The air from outside oven 100 is directed, as shown by arrows 146, past user interface 171 removing heat to reduce or maintain a temperature within a predetermined range. The predetermined range reduces or prevents damage to user interface 171 due to heat. Circulating the air from outside oven 100 cools user interface 171 reducing an effect of the heat on the service life of user interface 171. User interface 171 can have a reduction in temperature of over 50 degrees Celsius, reducing the heat transfer to the user when the user contacts portion 181 of user interface. The air from outside oven 100 that is directed, as shown by arrows 146, past user interface 171 that may pass through holes 177 in control box 176 into contact with user interface 171. The air from outside oven 100 may also be directed past transformer 160 and motor 147 removing heat and reducing an effect of the heat on the service life.

Cooling device 178 may use an internal air pressure within duct 130 that is increased when fan 170 circulates the air from outside oven into duct 130. The internal air pressure creates an airflow through any holes in outer enclosure 125 to outside of oven 100 or ambient, for example, through vents 179 and one or more holes 180. As shown in FIG. 1, holes 180 create airflow 185. The airflow is circulated into interior volume through fan 170, as shown by arrows 145, past user interface, as shown by arrows 146, and out of holes 180, as shown by arrows 185. Airflow 185 is directed away from user interface 171 when passing through holes 180. When passing through holes 180, the airflow 185 cools the closed door 109 and creates an air curtain protecting the user interface 171 from heat radiation.

When door 109 is opened after interior volume 120 is heated, cooking device 100 vents heat by releasing hot air and/or steam through open front portion 119. It has been found by the present invention, that airflow 185 deflects the hot air and/or steam that emanates from interior volume 120 away from user interface 171 when door 109 is open. Airflow 185 keeps user interface 171 at a reduced temperature than without airflow 185. Airflow 185 creates an "air curtain" that creates a barrier between the hot air and steam that rises out of interior volume 120, and user interface 171. The air curtain is created so that when door 109 is opened the air curtain directs the hot air and steam away from user interface 171 and cushions portion 181 of user interface 171 in cool air. Airflow 185 protects user interface from the hot air and steam when door 109 is open and maintains user interface 171 cooler to the touch of a user than without airflow 185 to increase the service life of user interface 171. When the door 109 is in the closed position, air passes through the holes 180 and is forced by the door to take the path shown by the arrows 185 creating an air curtain. When the door 109 is opened, the steam and air pressure created in the interior volume 120 is released through the open front portion 119, forcing the air to follow the path shown by the arrows 185 to create the air curtain. Temperature reductions of portion 175 of user interface 171 can be in excess of 50 degrees Celsius.

When door 109 is in the closed position, fan 170 may be in fluid communication with a passageway around door 109. The passageway may comprise holes 180 to create an airflow or air curtain directed over door 109. Door 109 is maintained at a cooler temperature than an oven without the airflow through holes 180 over door 109. Alternatively, the passageway may direct the airflow around a surface of door 109 within outer enclosure 125. Door 109 having a reduced temperature, reduces heat transfer to the user when the user contacts door 109. Airflow 185 can reduce the door 109 temperature more than 50 degrees Celsius.

It should also be noted that the terms "first", "second", "third", "upper", "lower", "above", "below", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A cooking device comprising:
an outer enclosure comprising at least a top, bottom, front wall, sidewalls and rear wall;
a cooking chamber disposed within said outer enclosure, wherein said outer enclosure further includes an opening in the front wall that enables access to said cooking chamber;
a door disposed about said opening and positioned below said top of said outer enclosure;
a user interface disposed about a front facing surface of said front wall of said outer enclosure above said door;
a cooling device that comprises:
an inlet disposed in said outer enclosure;
a conduit in communication with said inlet and said user interface; and
a fan in communication with said conduit, wherein said fan draws a cooling air from outside of said outer enclosure and through said conduit such that at least a portion of said cooling air contacts said user interface to remove heat from the user interface; and
at least one aperture disposed in a bottom facing surface of said front wall below said user interface substantially adjacent to a top surface of said door and in communication with said conduit such that said cooling air that exits said outer enclosure via said conduit and said at least one aperture after contacting said user interface, wherein said cooling air:
(i) contacts said top surface of said door when said door is in a closed position, and
(ii) forms an air curtain when said door is in an opened position.

2. The cooking device of claim 1, wherein said airflow cools other members of said cooking device within said conduit.

3. The cooking device of claim 1, wherein each of the at least one aperture in said bottom facing surface has an airflow of said cooling air through each of the at least one aperture to form said air curtain.

4. The cooking device of claim 1, wherein the at least one aperture in said bottom facing surface forms said air curtain so that an airflow of hot air from said opening of said outer enclosure is directed away from said user interface.

5. The cooking device of claim 1, wherein the at least one aperture in said bottom facing surface is uncovered when said door is in said opened position.

6. The cooking device of claim 5, wherein said air curtain directs heat and/or steam generated within said cooking chamber away from said user interface when said door is in said opened position.

7. The cooking device of claim 1, wherein said cooling device comprises said fan that generates an airflow of the cooling air in a first space between said cooking chamber and said outer enclosure, and wherein said airflow flows in a second space between said fan and said door, and wherein said fan is in fluid communication with a passageway around said door when said door is in said closed position.

8. The cooking device of claim 1, wherein said air curtain is directed toward said door.

9. The cooking device of claim 7, wherein said passageway directs said airflow around a surface of said door within said outer enclosure.

10. The cooking device of claim 4, wherein said user interface is connected to said outer enclosure directly above said one or more holes.

11. A cooking device comprising:
an outer enclosure comprising at least a top, bottom, front wall, sidewalls and rear wall;
a cooking chamber disposed within said outer enclosure, wherein said outer enclosure further includes an opening in the front wall that enables access to said cooking chamber;
a door disposed about said opening and positioned below said top of said outer enclosure;
a user interface disposed about a front facing surface of said front wall of said outer enclosure above said door; and
a cooling device that comprises:
an inlet disposed in said outer enclosure;
a conduit in communication with said inlet and said user interface; and
a fan in communication with said conduit, wherein said fan draws a cooling air from outside of said outer enclosure and through said conduit such that at least a portion of said cooling air contacts said user interface to remove heat from the user interface; and
at least one aperture disposed in a bottom facing surface of said front wall below said user interface substantially adjacent to a top surface of said door and in communication with said conduit such that said cooling air that exits said outer enclosure via said conduit and said at least one aperture after contacting said user interface, wherein said cooling air forms an air curtain to deflect away at least a portion of a heated air of the cooking chamber from contacting an outer surface of said user interface when said door is in an opened position.

12. The cooking device of claim 11, wherein each of the at least one aperture in said bottom facing surface of said top of said outer enclosure has an airflow of said cooling air through each of the at least one aperture to form said air curtain.

13. The cooking device of claim 11, wherein said the at least one aperture in said bottom facing surface of said top of said outer enclosure forms said air curtain so that an airflow of said cooling air and hot air from said opening of said outer enclosure is directed away from said user interface.

14. The cooking device of claim 11, wherein said the at least one aperture in said bottom facing surface of said top of said outer enclosure is uncovered when said door is in said opened position.

15. The cooking device of claim 11, wherein said air curtain directs heat and/or steam generated within said cooking chamber away from said user interface when said door is in said opened position.

16. The cooking device of claim 11, wherein said cooling device comprises said fan that generates an airflow of the cooling air in a first space between said cooking chamber and said outer enclosure, and wherein said airflow flows in a second space between said fan and said door, and wherein said fan is in fluid communication with a passageway around said door when said door is in said closed position.

17. The cooking device of claim 16, wherein said passageway directs said airflow around a surface of said door within said outer enclosure.

* * * * *